(12) United States Patent
Hao et al.

(10) Patent No.: US 10,614,094 B2
(45) Date of Patent: Apr. 7, 2020

(54) VISUALIZING TOPICS WITH BUBBLES INCLUDING PIXELS

(71) Applicant: Hewlett Packard Enterprise Development LP, Houston, TX (US)

(72) Inventors: Ming C. Hao, Palo Alto, CA (US); Michael Hund, Hauptstrass (DE); Christian Rohrdantz, Hauptstrass (DE); Riddhiman Ghosh, Sunnyvale, CA (US); Nelson L. Chang, San Jose, CA (US); Meichun Hsu, Los Altos Hills, CA (US); Daniel Keim, Hauptstrass (DE)

(73) Assignee: MICRO FOCUS LLC, Santa Clara, CA (US)

( * ) Notice: Subject to any disclaimer, the term of this patent is extended or adjusted under 35 U.S.C. 154(b) by 568 days.

(21) Appl. No.: 15/114,198

(22) PCT Filed: Apr. 30, 2014

(86) PCT No.: PCT/US2014/036056
§ 371 (c)(1),
(2) Date: Jul. 26, 2016

(87) PCT Pub. No.: WO2015/167497
PCT Pub. Date: Nov. 5, 2015

(65) Prior Publication Data
US 2016/0371350 A1    Dec. 22, 2016

(51) Int. Cl.
*G06F 16/26* (2019.01)
*G06F 16/35* (2019.01)
(Continued)

(52) U.S. Cl.
CPC ......... *G06F 16/26* (2019.01); *G06F 16/2272* (2019.01); *G06F 16/24578* (2019.01); *G06F 16/35* (2019.01); *G06T 11/60* (2013.01)

(58) Field of Classification Search
CPC ......... G06F 17/30572; G06F 17/30651; G06F 16/26; G06F 16/2272
(Continued)

(56) References Cited

U.S. PATENT DOCUMENTS 6,411,936 B1    6/2002  Sanders
8,600,796 B1 *  12/2013 Sterne ................ G06Q 30/0203
                                                 705/7.29

(Continued)

FOREIGN PATENT DOCUMENTS

WO    WO-2012-167399 A1    12/2012

OTHER PUBLICATIONS

Duan, et al., "VISA: A Visual Sentiment Analysis System" VINCI'12, Sep. 27-28, 2012 (9 pages).
(Continued)

*Primary Examiner* — Jensen Hu

(57) ABSTRACT

A technique for visualizing topics includes depicting topic bubbles including pixels. In one example, selected topics are identified from records based on scoring candidate terms in the records according to a user-specified metric and a metric selected from among frequencies of occurrence of records pertaining to the respective candidate terms, and negativity of sentiment expressed with respect to the candidate terms in the records. A visualization is generated including bubbles representing topics, the bubbles including pixels representing corresponding records. A bubble has a shape dependent upon a number of records and a time interval represented by the bubble. Visual indicators are assigned to the pixels in a given bubble according to values of an attribute expressed in the corresponding records for the topic represented by the given bubble, resulting in the analysis of the selected topics being less time consuming and labor intensive.

20 Claims, 6 Drawing Sheets

(51) Int. Cl.
    *G06F 16/22*     (2019.01)
    *G06F 16/2457*     (2019.01)
    *G06T 11/60*     (2006.01)

(58) Field of Classification Search
    USPC .......................................................... 707/730
    See application file for complete search history.

(56) References Cited

U.S. PATENT DOCUMENTS

| | | | |
|---|---|---|---|
| 2003/0122874 A1 | 7/2003 | Dieberger | |
| 2004/0083127 A1 | 4/2004 | Lunsford | |
| 2004/0252128 A1* | 12/2004 | Hao | G06Q 10/10 345/581 |
| 2006/0026210 A1 | 2/2006 | Vaszry | |
| 2008/0256040 A1* | 10/2008 | Sundaresan | G06Q 30/02 707/999.003 |
| 2010/0106752 A1* | 4/2010 | Eckardt, III | G06F 17/30696 707/805 |
| 2010/0231594 A1* | 9/2010 | Hao | G06T 11/206 345/440 |
| 2010/0332465 A1* | 12/2010 | Janssens | G06F 17/30696 707/722 |
| 2011/0055212 A1* | 3/2011 | Tsai | G06K 9/622 707/737 |
| 2011/0314007 A1 | 12/2011 | Dassa | |
| 2012/0011006 A1 | 1/2012 | Schultz | |
| 2012/0011158 A1 | 1/2012 | Avner | |
| 2012/0023522 A1* | 1/2012 | Anderson | G06Q 30/02 725/35 |
| 2012/0109843 A1 | 5/2012 | Hao | |
| 2012/0290950 A1* | 11/2012 | Rapaport | G06Q 10/10 715/753 |
| 2012/0317049 A1* | 12/2012 | Hao | G06Q 10/00 705/347 |
| 2012/0323627 A1 | 12/2012 | Herring, Jr. et al. | |
| 2013/0073336 A1 | 3/2013 | Heath | |
| 2013/0194272 A1* | 8/2013 | Hao | G06T 11/206 345/440 |
| 2013/0232263 A1* | 9/2013 | Kelly | G06Q 30/02 709/224 |
| 2014/0019119 A1* | 1/2014 | Liu | G06F 17/2229 704/9 |
| 2014/0040247 A1 | 2/2014 | Hao | |
| 2016/0140208 A1* | 5/2016 | Dang | G06F 17/18 707/737 |

OTHER PUBLICATIONS

Milos Krstajic et al, "Cloudlines: Compact Display of Event Episodes in Multiple Time-Series", cited in OA; Dec. 2011; 8 pages.
Oelke et al, "Visual Opinion Analysis of Customer Feedback Data", IEEE VAST, p. 187-194, Oct. 2009.
Rohrdantz, et al., "Feature-based Visual Sentiment Analysis of Text Document Streams" ACM Journal Name, vol. 1, Dec. 2010 (pp. 1-27).
Wang, et al., "SentiView; Sentiment Analysis and Visualization for Internet Popular Topics" IEEE Transactions on Human-Machine Systems, 2013 (11 pages).
www.clarabridge.com;, Clarabridge Enterprise | License Version or SaaS Subscription dated on or before Jul. 22, 2010.
www.sas.com, Social Media Monitoring and Analysis, SAS Social Media Analytic | SAS dated on or before Jul. 22, 2010 ( 4 pages).
Zhicheng Liu et al, SellTrend: Inter-Attribute Visual Analysis of Temporal Transaction Data, IEEE, Nov./Dec. 2009 (8 pages).
Franz Wanner, et al; Visual Sentimental Analysis of RSS News Feeds Featuring the US Presidential Election in 2008, workshop on visual Interfaces to the Social and the Semantic Web (VISSW2009), IUI2009, Feb. 8, 2009.
International Search Report and Written Opinion of the International Searching Authority, dated Jan. 29, 2015, issued in related PCT Application No. PCT/US2014/036056.
Nicholas Diakopoulos, et al., Diamonds in the Rough: Social Media Visual Analysis for Journalistic Inquiry; Rutgers University, School of Communication and Information, Oct. 2010 (8 pgs).

\* cited by examiner

VISUALIZING TOPICS WITH BUBBLES INCLUDING PIXELS

BACKGROUND

An enterprise can receive various types of user reviews that contain feedback about the enterprise. User reviews can be submitted online at third-party sites (e.g. web survey sites or social networking sites). Alternatively, reviews can be received directly by an enterprise. There can potentially be a relatively large number of data records containing user reviews, which can make meaningful analysis of such data records difficult and time-consuming.

BRIEF DESCRIPTION OF THE DRAWINGS

Some implementations are described with respect to the following figures.

DETAILED DESCRIPTION

Figure 1:
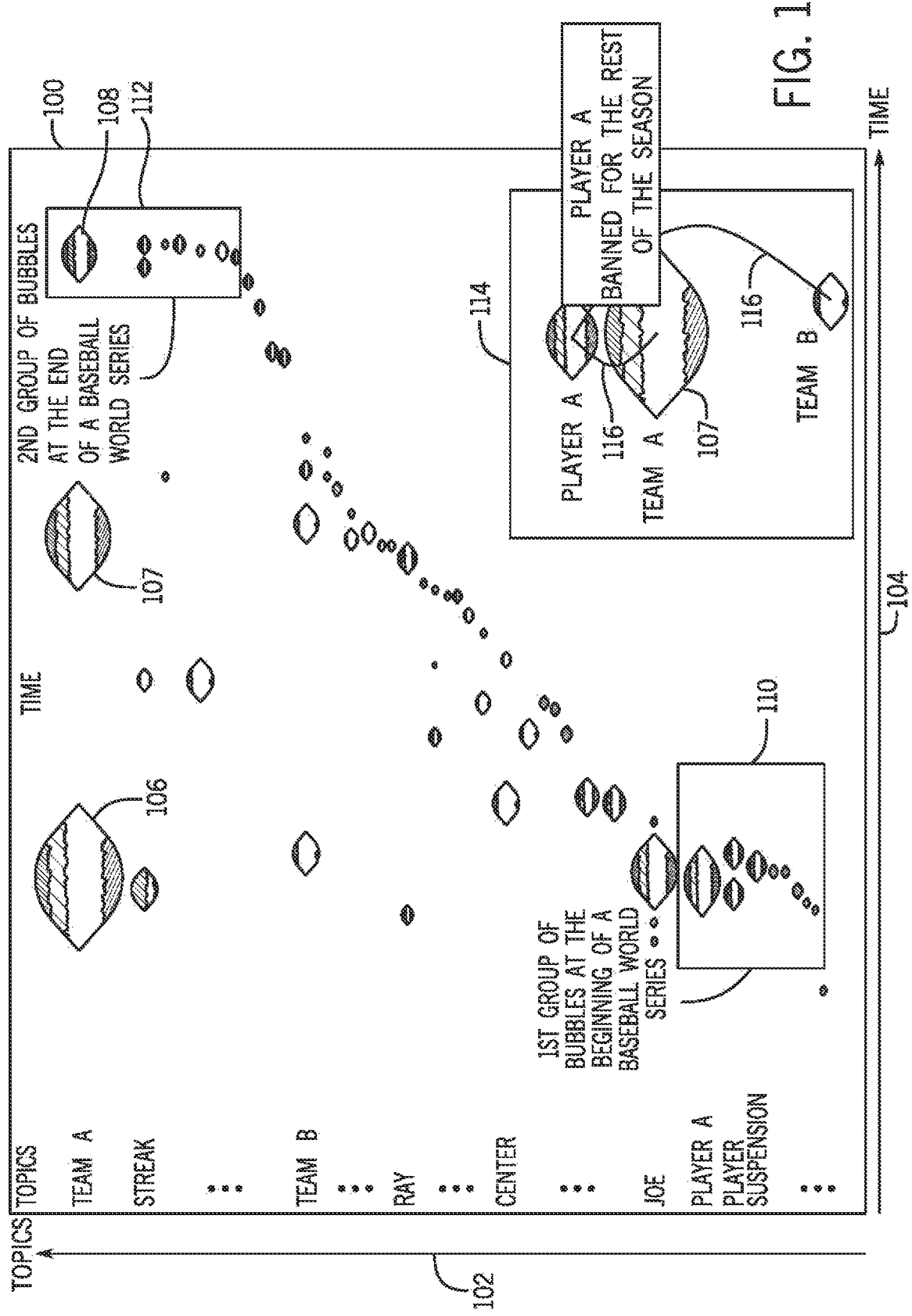
FIG. 1 illustrates an example graphical visualization that includes bubbles representing respective topics, in accordance with some implementations.

An enterprise (e.g. a company, educational organization, government agency, individual, etc.) may collect feedback from users that can be used to better understand user sentiment regarding the enterprise, such as about an offering of the enterprise or another feature of the enterprise. An offering can include a product or a service provided by the enterprise. A "sentiment" refers to an attitude, opinion, or judgment of a human with respect to the offering. An opinion or other sentiment can be mapped to an attribute (such as an attribute associated with an offering) to indicate a degree of satisfaction or other sentiment with the attribute.

User feedback can be collected from various sources, such as online websites of the enterprise or third-party sites such as travel review websites, product review websites, social networking sites, web survey sites, customer support agents, and so forth. The user feedback can be received in data records. A "data record" can refer to a unit of data that contains collected information. For example, the data record can include a user review submitted by a particular user, in which the user may have expressed a sentiment with respect to an attribute. A data record can include one or multiple attributes, where an attribute can refer to an item (e.g. product offering, service offering, sport team, players of a sport team, a movie, a song, etc.) that may be the subject of review or feedback from users.

Visualizing relatively large volumes of data records containing user feedback for the purpose of sentiment analysis can be complex and time-consuming. In some examples, to discover issues that may be expressed by user feedback, an analysis of information contained in data records can be performed. For example, the analysis of the user feedback contained in the data records can attempt to identify time periods of increased negative sentiment, determine root causes of the negative sentiment, and to identify actions to take in response to the determined root causes.

Traditionally, the analysis of user feedback is performed manually, which can be time consuming and labor intensive. Also, manual analysis is prone to error, as an analyst may miss issues that may be expressed in data records. Also, manual analysis is usually performed in an offline manner based on a log of data records that was collected in the past. As a result, the identification of an issue may be delayed for a substantial amount of time.

In accordance with some implementations, automated visual analytics techniques or mechanisms are provided for identifying and visualizing issues in user feedback expressed in data records. In some implementations, the identification and visualization of issues in user feedback can be performed on a "real-time" basis, in which the identification and visualization can be performed as data records are being received. Although reference is made to real-time visual analytics in some implementations, it is noted that in alternative implementations, visual analytics can be performed in an offline manner on data records stored in a historical log or other historical data collection.

The identified issues are represented as topics, where a topic provides a description or indication of an issue expressed in user feedback. Once topics are identified, the topics are depicted in a visualization (in the form of a graphical representation) that includes bubbles containing pixels. Each topic is represented by a set of one or multiple bubbles in the visualization. A "bubble" can refer to a discrete region containing pixels in the visualization that is visibly distinct from another region containing pixels in the visualization. The pixels of a bubble represent respective data records (e.g. user reviews) within a respective time interval for a given topic. Multiple bubbles representing a given topic correspond to respective different time intervals.

A pixel can refer to a graphical element that can be displayed in a visualization, where the graphical element can be in the form of a dot, square, circle, or any other shape. Each pixel is assigned a visual indicator to indicate a sentiment expressed with respect to an attribute contained in a data record. Pixels are assigned different visual indicators to depict corresponding different sentiments expressed with respect to a respective topic. For example, the visual indicators can include different colors. A first color can be assigned to a pixel for a positive user sentiment expressed with respect to the corresponding attribute, while a second, different color can be assigned to represent a negative user sentiment expressed with respect to the attribute. In some examples, a positive sentiment can be indicated by a green color, while a negative sentiment can be indicated by a red color. Different shades of green can express different levels of positive user sentiment (e.g. darker green can express a more positive sentiment than a lighter green). Similarly, different shades of red can express different levels of negative sentiment (e.g. darker red can express a more negative sentiment that lighter red). A neutral sentiment (a sentiment that is neither positive nor negative) can be expressed by a different color, such as a gray or white color. In other examples, other colors can be used to express different sentiments.

In some examples, the sentiment expressed in a particular data record for a given attribute can be based on scores assigned by a user (e.g., a score between 1 and 5, where 5 is positive while 1 is negative and 3 is neutral, or a score from among −2, −1, 0, +1, +2, where the positive values reflect positive sentiment, negative values reflect negative sentiment, and 0 reflects a neutral sentiment). In other examples, the sentiment expressed in a particular data record for a given attribute can be based on an analysis of words in the particular data record. For example, the analysis can identify sentiment words associated with nouns (or compound nouns) that are targets of the sentiment words. The sentiment words can be processed to determine the corresponding sentiment (e.g. positive sentiment, negative sentiment, neutral sentiment).

FIG. 1 illustrates an example visualization 100 that has a first axis 102 and a second axis 104. Different points along the first axis 102 represents respective topics, while different points along the second axis 104 represents different points in time. The example topics depicted in the visualization 100 include "TEAM A," "GAME," "STREAK," and so forth. Various bubbles are included in the visualization 100, with bubbles 106, 107, and 108 being referenced in FIG. 1. Each bubble includes an arrangement of pixels assigned respective different colors corresponding to sentiments expressed with respect to the respective topic. Different cross hatchings within each bubble represent respective different collections of pixels assigned corresponding different colors.

In the example of FIG. 1, the bubbles 106, 107, and 108 represent the "TEAM A" topic, and different colors assigned to the pixels in the bubbles 106, 107, and 108 are based on respective sentiments expressed with respect to the "TEAM A" topic for different respective time intervals. The topics 106, 107, and 108 are arranged across a row in the visualization 100 (each row in the visualization 100 is made up of a horizontal line or arrangement of one or multiple bubbles). Each different row in the visualization 100 includes one or multiple bubbles corresponding to a respective different topic. For the sake of clarity, some of the topics are not listed in the visualization of FIG. 1.

More generally, bubbles arranged along a given line (e.g. row) that is parallel to the time axis of the visualization 100 represent a respective topic.

In the example of FIG. 1, it is assumed that data records represented by pixels in the various bubbles of the visualization 100 include user feedback with respect to teams, players, and other attributes of a baseball world series. FIG. 1 also shows a group 110 of bubbles that represent various topics at the beginning of the world series, and a second group 112 of bubbles that represent topics at the end of the world series.

The visualization 100 can be an interactive visualization, such that a user can interact with elements in the visualization 100. For example, using a user input device (e.g. mouse device, touchscreen, keyboard, etc.), a user can move a cursor over a pixel included in a bubble in the visualization 100. Once the cursor is moved over the pixel, a dialog box can pop up, where the dialog box can include further details regarding the content of the data record (e.g. user review) represented by the pixel.

In addition, to zoom into a portion of the visualization, a user can select a bubble, such as by clicking on a button of a mouse device, tapping on the location of the bubble on a touchscreen, and so forth. In response to user selection of a bubble, another visualization screen can be displayed, such as visualization screen 114 shown in FIG. 1, which provides a zoomed view. In the example of FIG. 1, the bubble selected by the user can be bubble 107. In response to user selection of the bubble 107, the visualization screen 114 displays the selected bubble 107, along with other bubbles that are associated with the selected bubble 107. In the visualization screen 114, a bubble representing a "PLAYER A" topic is linked by a link 116 to the selected bubble 107. Also, the bubble representing the "PLAYER A" topic is linked by a link 116 to a bubble representing a "TEAM B" topic. Bubbles can be linked together if they share data records or information in data records, for example, or according to another criterion. Note that the bubbles in the visualization screen 114 are bubbles containing pixels representing data records that correspond to a specific time interval. In this example, bubbles from different time intervals are not linked together. The visualization screen 114 thus provides a zoomed view, and also links a selected bubble with other bubbles.

Figure 2:
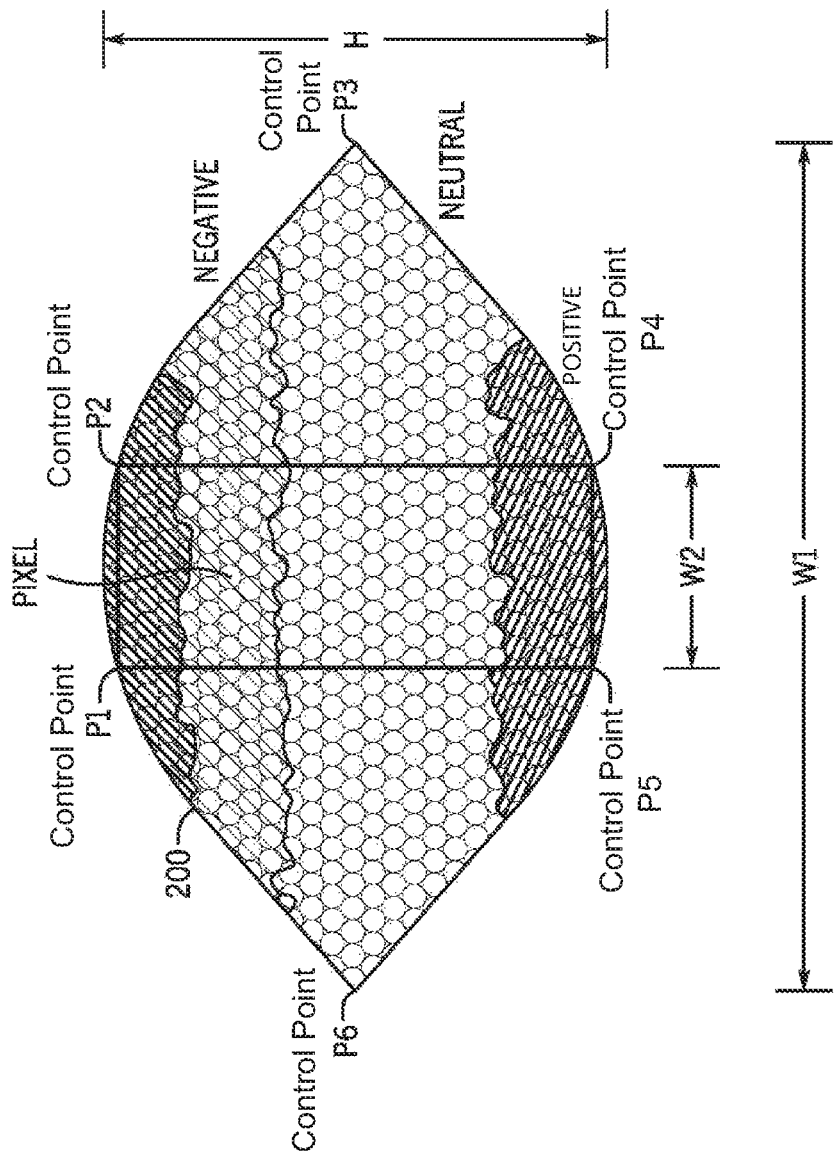
FIG. 2 is an example schematic diagram of a bubble including pixels assigned to visual indicators corresponding to sentiments expressed in data records, in accordance with some implementations.

FIG. 2 is a schematic diagram of a bubble 200, according to some implementations. As shown in FIG. 2, pixels are depicted as little circles, and these pixels represent corresponding data records. Visual indicators are assigned to the pixels based on sentiments expressed with respect to a respective topic by the data records represented by the pixels. The pixels are located in regions of the bubbles with different cross hatchings, which represent different colors assigned to the pixels. Pixels in the upper portions of the pixel 200 are assigned color(s) corresponding to a negative sentiment, pixels in the lower portions of the bubble 200 are assigned color(s) corresponding to a positive sentiment, and pixels in a portion between the upper and lower portions are assigned a color corresponding to a neutral sentiment. The pixels are sorted in the bubble 200 according to sentiment scores assigned to the pixels, such that groups of pixels of common color are formed (the groups corresponding to the portions of the bubble 200 of FIG. 2).

The bubble 200 has various dimensions, including a height (H), an overall width (W1), and a center width (W2). The number of data records represented by the bubble 200 determines the size and shape of the bubble. The area of the bubble 200 is set to allow the bubble 200 to contain the number of pixels representing the data records corresponding to the bubble 200. Also, the overall width W1 of the bubble 200 is based on the time interval represented by the bubble 200.

In some examples, the height (H) of the bubble 200 is restricted according to the following condition to avoid a bubble having an irregular shape, and to obtain more space along the axis 102 (FIG. 1) of the visualization 100 to depict topics:

$$H \leq \frac{2}{3} W1. \qquad \text{(Eq. 1)}$$

Although a specific relationship between H and W1 is expressed in Eq. 1, it is noted that in other examples, a different relationship can be specified between H and W1.

In some examples, a bubble can be drawn using a B-Spline function. A B-Spline function employs six control points, P1, P2, P3, P4, P5, and P6 shown in FIG. 2. The control points P1 and P2 are separated by the center width (W2). Similarly, the control points P4 and P5, are separated by the center width (W2).

In other examples, other types of functions can be used for drawing the bubble 200.

In other examples, instead of having the shape 200 shown in FIG. 2, a bubble can have a different shape, such as a circular shape, an elliptical shape, a polygonal shape, and so forth.

Figure 6:
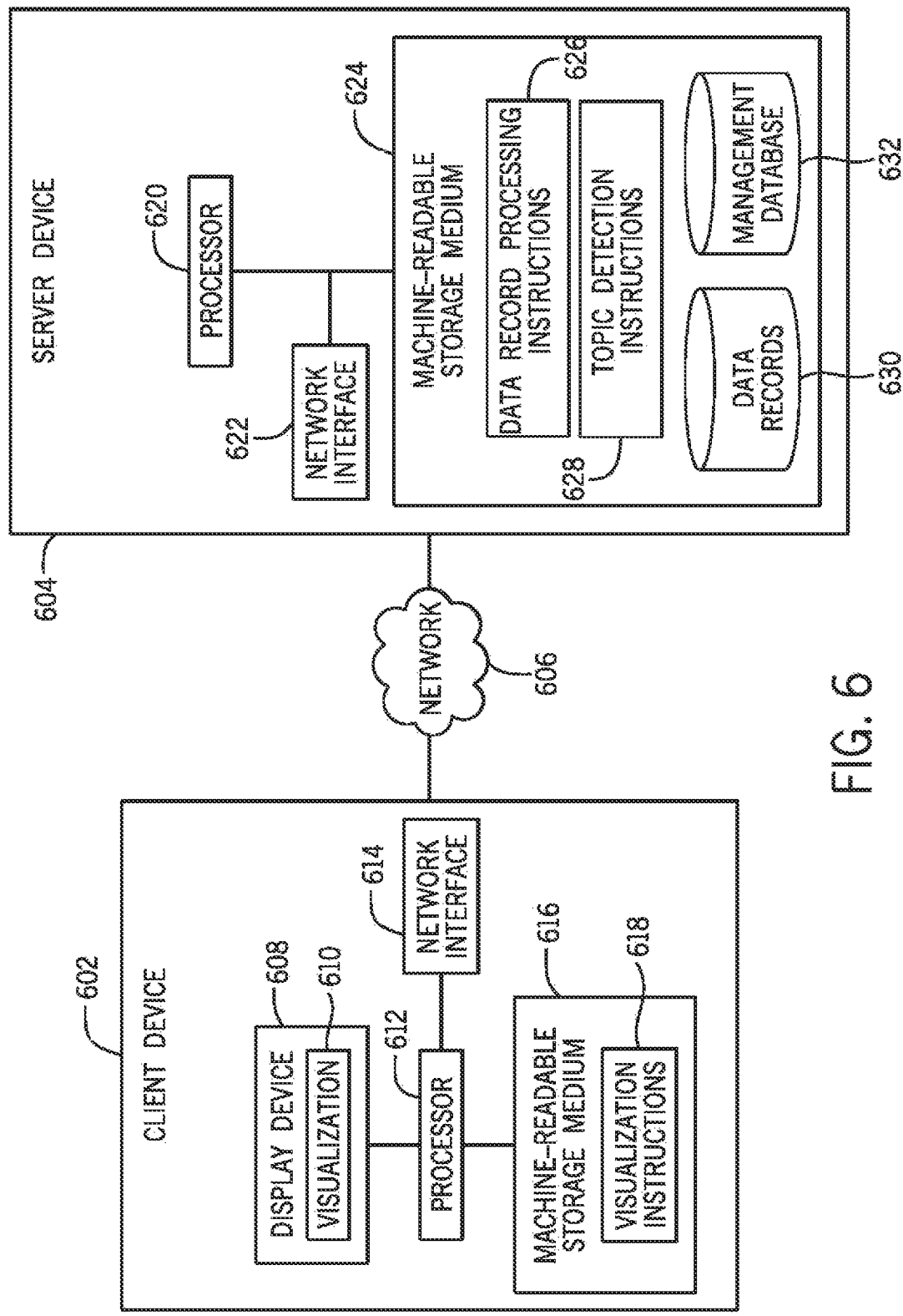
FIG. 6 is a block diagram of an example arrangement including a client device and a server device, according to some implementations.

The ensuing discussion refers to various processes. In some examples, some of the processes can be performed by a client device (e.g. client device 602 in FIG. 6), while other processes can be performed by a server device (e.g. server device 604 in FIG. 6). FIG. 6 is discussed further below. A client device can refer to an electronic device (e.g. desktop computer, notebook computer, tablet computer, smartphone, personal digital assistant, etc.) that includes or is associated with a display device in which a user can view a visualization (e.g. 100 in FIG. 1). A server device can refer to a computer or a collection of computers that a client device can communicate with over a network.

Figure 3:
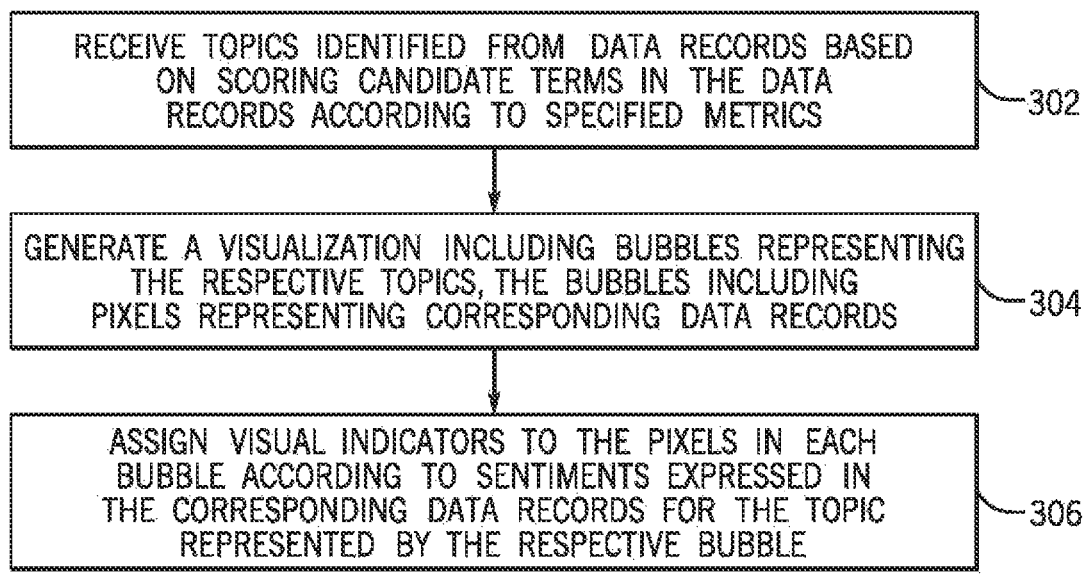
FIG. 3 is a flow diagram of an example visualization process at a client device, according to some implementations.

FIG. 3 is a flow diagram of a visualization process at a client device according to some implementations. The visualization process receives (at 302) selected topics identified from data records. The topics are identified based on scoring candidate terms in the data records according to specified metrics. The selected topics can be considered critical topics or important topics, from the perspective of a given enterprise (e.g. business concern, educational organization, government agency, individual, etc.). A "candidate term" can refer to certain words (e.g. a noun or a combination of nouns) included in a data record, where the noun or combination of nouns can be a candidate topic to be visualized. Scoring of the candidate terms allows scores to be assigned to the candidate terms, such that candidate terms with higher scores can be selected as topics for visualization. Candidate terms with lower scores can be omitted from visualization.

The specified metrics used for scoring the candidate terms can include some combination of the following: (1) a frequency metric, which represents the frequency of occurrence of data records pertaining to a respective candidate term, (2) a negativity metric, which represents the negativity of sentiment expressed with respect to a candidate term, (3) a context coherence metric, which indicates whether text expressed by multiple data records pertaining to a candidate term relate to a common topic, and (4) a user-specified metric, which can be any metric specified by a user to affect scoring of a candidate term.

The frequency metric for a candidate term is computed by determining the number of data records containing the candidate term within a given time interval. The negativity metric for a candidate term can be determined by summing (or otherwise aggregating) sentiment scores (e.g. sentiment scores assigned by users, or sentiment scores derived based on opinion words expressed about the candidate term) for the candidate term in data records within a given time interval. Other types of aggregating of sentiment scores can include averaging the sentiment scores, identifying a median of the sentiment scores, identifying a maximum or minimum of the sentiment scores, or any other type of aggregating.

An example of a user-specified metric can relate to a threshold specified by a user relating to any attribute that may be contained in a data record. For example, the value of the user-specified metric can be set to a first value if the attribute exceeds the threshold, and to a second value if the attribute does not exceed the threshold. As another example, a user-specified metric can be a time-based metric, which can specify that more recent data records are to be weighted higher than less recent data records. Thus, a score computed for a candidate term can be adjusted based on relative recency of a data record in which the candidate term is included. Other examples of user-specified metrics can be used in other implementations. More generally, a user-specified metric can be provided based on user input to allow a user to control scoring of candidate terms. The user input can be received at an electronic device, or can be included in a file, such as a configuration file.

The following provides a further discussion of the context coherence metric. Assume a set of data records that each mentions a specific candidate term, e.g. a "USB cable" term. At this point, it is uncertain whether the data records that mention "USB cable" refer to the same issue, such as a missing USB cable. For example, one subset of the data records can refer to a yellow USB cable, while another subset of the data records can refer to a missing USB cable. Context coherence is determined by checking whether words besides "USB cable" mentioned in the set of data records are common in at least a majority of the data records in the set. As an example, one such word can be "missing," which can be in close proximity to the "USB cable" term in some of the data records. The presence of the word "missing" in close proximity to the "USB cable" term in a majority of the data records can indicate with some likelihood that "USB cable" is used in a common context, in other words, relate to the same issue (e.g. the issue of a missing USB cable). More specifically, the context coherence metric is based on whether co-occurrence of words in data records (e.g. user reviews) relate to the same issue (i.e. a respective topic).

The score (SCORE) that is assigned to a candidate term can be expressed as follows, in some examples:

$$SCORE = FREQUENCY \cdot SENTIMENT\_NEGATIVITY \cdot CONTEXT\_COHERENCE \cdot USER\_METRIC, \quad (Eq. 2)$$

where FREQUENCY is the frequency metric, SENTIMENT_NEGATIVITY is the negativity metric, CONTEXT_COHERENCE is the context coherence metric, and USER_METRIC is the user-specified metric. In Eq. 2, the score computed for each candidate term is based on a product of the foregoing metrics. In other examples, a different aggregation of the metrics can be performed, where the different aggregation can include a sum, a weighted sum, or some other aggregation function. Also, although the score in Eq. 2 is calculated on an aggregation of four metrics, it is noted that in other examples, a score can be calculated based on a smaller number of metrics, or a larger number of metrics. For example, the score can be calculated based on two or more of the listed metrics, or other metrics.

As further shown in FIG. 3, the visualization process generates (at 304) a visualization (e.g. 100 in FIG. 1) that includes bubbles representing the respective topics, where the bubbles include pixels representing corresponding data records. The visualization process further assigns (at 306) visual indicators (e.g. different colors) to the pixels in each bubble according to sentiments expressed in the corresponding data records for the topic represented by the respective bubble. In other examples, visual indicators are assigned to the pixels according to values of other types of attributes contained in the data records.

Figure 4:
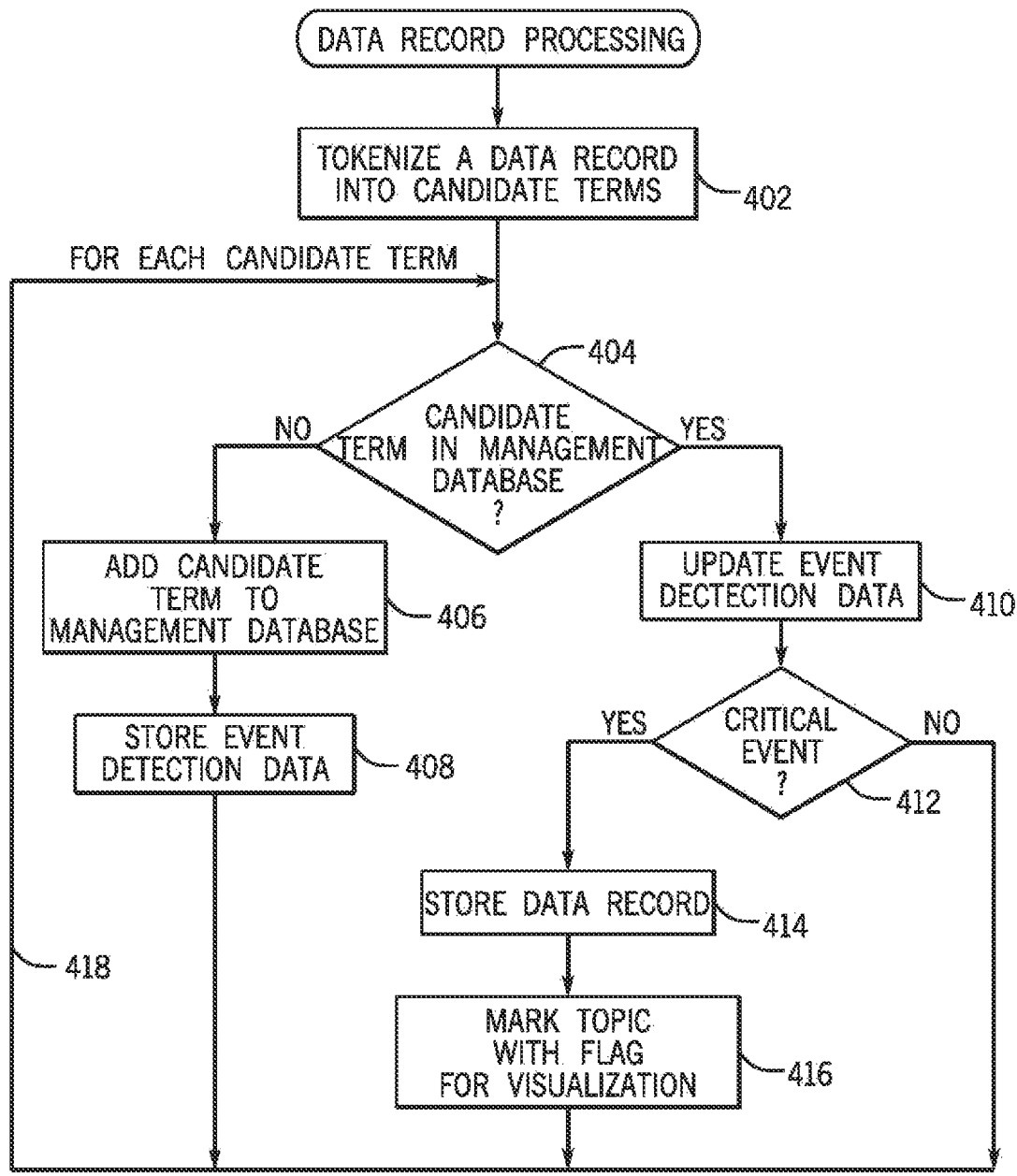
FIG. 4 is a flow diagram of example data record processing at a server device according to some implementations.

FIG. 4 is a flow diagram of data record processing at a server device according to some implementations. The procedure of FIG. 4 is repeated for each data record that is received. The data record processing includes tokenizing (at 402) the data record into candidate terms. Tokenizing a data record refers to breaking up a data record into a collection of tokens, where some of the tokens can include candidate terms.

Tasks 404, 406, 408, 410, 412, 414, and 416 are performed iteratively for each of the candidate terms identified by the tokenizing (402). The data record processing determines (at 404) if the currently considered candidate term is in a management database. A management database is a data structure that stores candidate terms that have been previously processed. If the candidate term is not in the management database, then the candidate term is added (at 406) to the management database. In addition, event detection data associated with a candidate term is also stored, such as in the management database or in another data structure. Examples of event detection data can include any one or some combination of the following: a timestamp (to indicate the last time that a data record containing the candidate term was received), sentiment stores for the candidate term, descriptive terms that describe data records containing the candidate term, and so forth. Note that the event detection data can include information relating to the various metrics used for scoring the candidate terms, such as according to Eq. 2 above.

If the candidate term is determined (at 404) to already be in the management database, then the event detection data associated with the candidate term is updated (at 410). Next, it is determined (at 412) whether the candidate term is considered to correspond to a critical event (in other words, the candidate term is a critical or important topic that is to be visualized). This can be based on a score assigned to the candidate term, such as a score according to Eq. 2. If the score assigned to the candidate term is greater than some specified threshold, or the score assigned to the candidate term is within the top N(N>1) scores, then the candidate term is identified as a topic to be visualized. If the candidate term does not correspond to a critical event, then the data record processing proceeds to the next candidate term (418). However, if the candidate term is considered (at 412) to correspond to a critical event, then the respective data record is stored (at 414), and the topic is marked (at 416) with a flag for visualization. This flag indicates to a visualization process (such as the visualization process of FIG. 3) that the topic is to be visualized in a visualization (e.g. 100 in FIG. 1).

As noted above, techniques or mechanisms according to some implementations can be implemented in an arrangement that includes a client device and a server device (e.g. client device 602 and server device 604 shown in FIG. 6, discussed further below). In such an arrangement, the data record processing of FIG. 4 can be performed at the server device 604, while the visualization process of FIG. 3 can be performed at the client device 602.

In other examples, instead of performing the tasks of FIGS. 3 and 4 separately on the client device and the server device, the tasks can be performed on a common computer (or a common set of computers).

Figure 5:
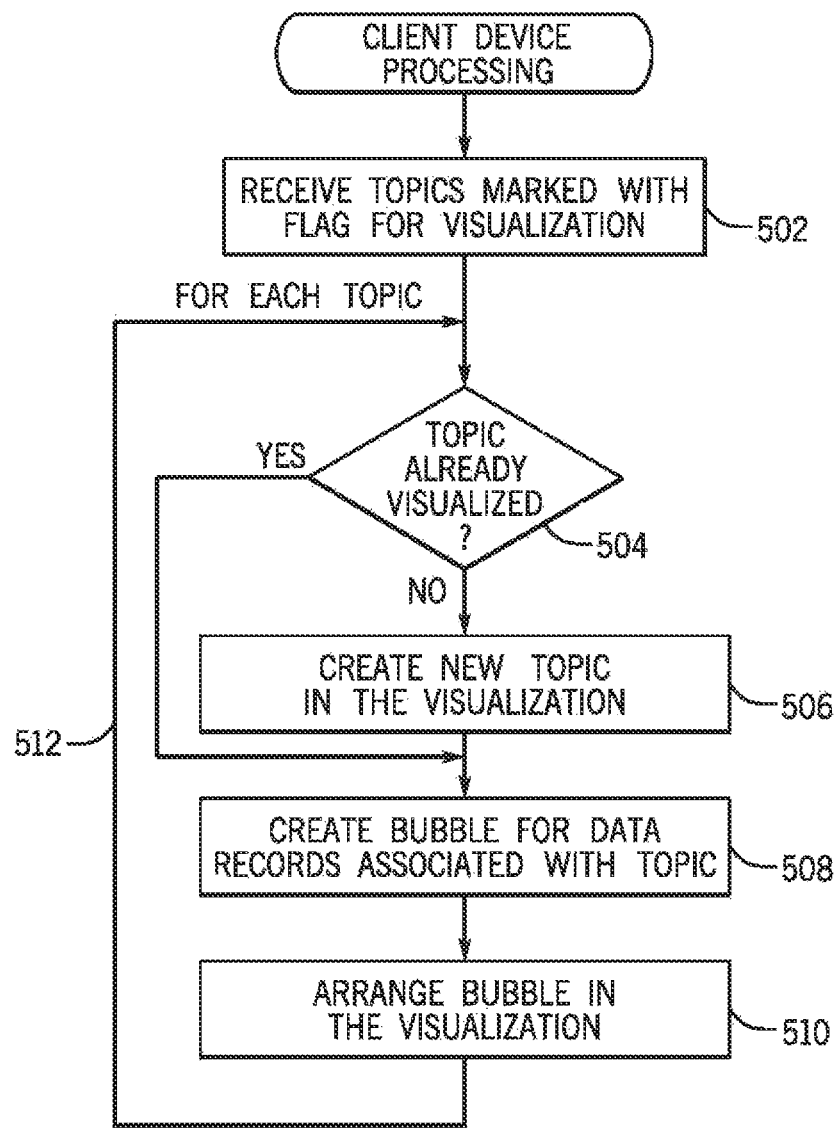
FIG. 5 is a flow diagram of an example process at a client device, according to some implementations.

FIG. 5 illustrates further processing performed at a client device (e.g. 602 in FIG. 6), according to some examples. The client device receives (at 502) topics marked with the flag for visualization (as marked at 416 in FIG. 4). Tasks 504, 506, 508, 510, and 512 are iteratively performed for each topic received. The client device determines (at 504) if the topic is already visualized. If not, a new topic is created (at 506) in the visualization. If the topic is already visualized, then a new topic does not have to be created.

Next, the client device creates (at 508) a bubble for data records associated with the topic. The bubble is then arranged (at 510) in the visualization. The process then proceeds to the next topic (512).

As data records are received, the visualization process can update the visualization in respective time intervals (e.g. every second, every minute, every hour, etc.). To do so, the timestamp of a first data record is recorded as the beginning of a current time interval. The end of the current tune interval can be a time equal to the timestamp corresponding to the beginning of the first interval plus the length of the interval, where the length can be a specified length (e.g. set by a user, or preset in a system). Whenever a new data record is received, the system checks whether the data record is still in the current time interval. If the newly received data record is in the current time interval, the data record is processed for visualization in a bubble corresponding to the current time interval. However, if the newly received data record is not in the current time interval, then the visualization is updated to create a new time interval, such that the newly received data record is visualized in a bubble in the new time interval.

Arranging a bubble in the visualization, as performed at 510 in FIG. 5, can include merging multiple bubbles or splitting a bubble into multiple bubbles. Two bubbles are merged when at least the width of at least one of the bubbles increases such that the two bubbles overlap. In response to detecting overlap of the two bubbles, the two bubbles can be merged into one bubble.

A given bubble is split into multiple bubbles if there is a time gap in the given bubble with no pixels (in other words, there are no data records relating to a respective topic in the time gap). If such a time gap is detected, then the given bubble is split into two bubbles separated by the time gaps.

As new data records are received for inclusion in a bubble, the size and shape of the bubble can be updated, by increasing the width (W1) and/or height (H) of the bubble. The size and shape of the bubble is updated in a manner that is consistent with Eq. 1, for example.

In some examples, the topics in the visualization 100 can be arranged such that topics for which more recent data records have been received are arranged closer to the top of the visualization 100 than topics for which data records have not been recently received. The older topics (those topics for which data records have not been received for some time) are moved closer to the bottom of the visualization 100. However, an older topic that is near the bottom of the visualization 100 can be moved closer to the top of the visualization 100 if data records referring to the older topic are recently received.

Thus, as data records are received, the positions of the topics (and thus the corresponding bubbles) can continually change. In addition, as data records are received, the size and shape of certain bubbles can also continually change. Thus, the visualization (e.g. 100 in FIG. 1) is dynamically updated as data records are received.

FIG. 6 is a block diagram of an example arrangement that includes the client device 602 and the server device 604, which can be coupled over a network 606. The client device 602 includes a display device 608, which can display a visualization 610 (e.g. 100 in FIG. 1). The client device 602 also includes one or multiple processors 612, which can be coupled to a network interface 614 (for communications over the network 606), and a non-transitory machine-readable or computer-readable storage medium (or storage media) 616. A processor can include a microprocessor, microcontroller, processor module or subsystem, programmable integrated circuit, programmable gate array, or another control or computing device.

The storage medium (or storage media) 616 can store visualization instructions 618, which are executable on the processor(s) 612 to perform various tasks discussed above including tasks of FIGS. 3 and 5, as examples. Moreover, note that in some implementations (such as implementations without the server device 604), the visualization instructions 618 can also perform tasks of FIG. 4.

The server device 604 includes one or multiple processors 620, which can be coupled to a network interface 622 (for communications over the network 606), and to a non-transitory machine-readable or computer-readable storage medium (or storage media) 624. The storage medium (or storage media) 624 can store data record processing instructions 626 and topic detection instructions 628. The data record processing instructions 626 can perform the processing of FIG. 4, for example. The topic detection instructions 628 can apply the scoring function according to Eq. 2, to assign scores to candidate terms for the purpose of determining topics for visualization based on the scores.

The storage medium (or storage media) 624 can also store various data records 630, as well as a management database 632. The management database 632 is the management database referred to above for storing candidate terms (and respective event detection data) that have been previously processed.

The storage media 616 and 624 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by a system including a processor, topics identified from records based on scoring candidate terms in the records according to a user-specified metric received by the system, and at least one further metric selected from among frequencies of occurrence of records pertaining to the candidate terms, and negativity of sentiment expressed with respect to the candidate terms in the records;
determining if each of the candidate terms corresponds to a critical event based on event detection data associated with each of the candidate terms;
generating for display, by the system, a visualization including bubbles representing the topics using the candidate terms that correspond to the critical event, wherein the bubbles each include pixels representing corresponding records, and further wherein a given bubble of the bubbles has a shape dependent upon a number of records represented by the given bubble and a time interval represented by the given bubble;
assigning, by the system, visual indicators to the pixels in the given bubble according to values of an attribute expressed in the corresponding records for a topic of the topics represented by the given bubble;
updating the visualization to create a new time interval if a newly received record is outside a current time interval; and
visualizing the newly received record in the new time interval.

2. The method of claim 1, wherein the scoring of the candidate terms in the records is further according to a context coherence metric that indicates whether a candidate term included in multiple ones of the records relates to a common topic.

3. The method of claim 1, wherein the visualization is an interactive visualization, the method further comprising:
receiving a user selection of at least one bubble in the interactive visualization; and
in response to the user selection, generating a zoomed view of the at least one bubble linked with at least another bubble.

4. The method of claim 1, wherein the generating and the assigning are performed in real time as the records are received.

5. The method of claim 1, wherein the system includes a client device, and the topics are received from a server device that identified the topics.

6. The method of claim 1, wherein a first axis of the visualization corresponds to the topics, and a second axis of the visualization corresponds to time intervals, the method further comprising:
arranging a plurality of the bubbles along a line parallel to the second axis in the visualization, wherein the plurality of the bubbles relates to one of the topics.

7. The method of claim 1, wherein assigning the visual indicators comprises assigning different colors according to different sentiments including a positive sentiment and a negative sentiment.

8. The method of claim 1, wherein the topics are identified by selecting a subset of the candidate terms based on scores produced by the scoring.

9. The method of claim 1, further comprising merging at least two of the bubbles in response to at least one of the at least two bubbles growing in size such that the at least two bubbles overlap.

10. The method of claim 1, further comprising splitting a particular one of the bubbles into multiple bubbles in response to detecting that a time gap with no records is present in the particular bubble.

11. A system comprising:
at least one processor to:
receive records including user feedback;
identify candidate terms in the records;
score the candidate terms according to a user-specified metric received by the system, and at least one further metric selected from among frequencies of occurrence of records pertaining to the candidate terms, and negativity of sentiment expressed with respect to the candidate terms in the records;
select, based on the scoring, a subset of the candidate terms as topics;
determine if each of the candidate terms corresponds to a critical event based on event detection data associated with each of the candidate terms;
generate for display a visualization including bubbles representing the topics using the candidate terms that correspond to the critical event, wherein the bubbles each include pixels representing corresponding records, and further wherein a given bubble of the bubbles has a size and shape dependent upon a number of records represented by the given bubble and a time interval represented by the given bubble, and wherein the pixels in the given bubble are assigned visual indicators according to sentiments expressed in the corresponding records for a topic of the topics represented by the given bubble;

update the visualization to create a new time interval if a newly received record is outside a current time interval; and visualize the newly received record in one of the bubbles in the new time interval.

12. The system of claim 11, wherein the visual indicators include different colors that correspond to a positive sentiment, a neutral sentiment, and a negative sentiment.

13. The system of claim 12, wherein the at least one processor is to sort the pixels within the given bubble by values of a sentiment attribute of the records represented by the given bubble, the sorting causing formation of groups of pixels, each of the groups including pixels of a same color.

14. The system of claim 11, wherein points along a first axis of the visualization correspond to different ones of the topics, and points along a second axis of the visualization corresponds to different times.

15. An article comprising at least one non-transitory machine-readable storage medium storing instructions that upon execution cause a system to:

receive topics identified in records based on scoring candidate terms in the records according to a user-specified metric and at least two metrics selected from the group consisting of: frequencies of occurrence of records pertaining to the candidate terms, negativity of sentiment expressed with respect to the candidate terms in the records, and a context coherence metric that indicates whether text expressed by multiple ones of the records pertaining to each candidate term relate to a common topic;

determine if each of the candidate terms corresponds to a critical event based on event detection data associated with each of the candidate terms;

generate for display a visualization including bubbles representing the topics using the candidate terms that correspond to the critical event, wherein the bubbles each include pixels representing corresponding records, and further wherein a given bubble of the bubbles has a size and shape dependent upon a number of records represented by the given bubble and a time interval represented by the given bubble, wherein points along a first axis of the visualization correspond to different ones of the topics, and points along a second axis of the visualization corresponds to different times, and wherein multiple bubble of the bubbles are arranged along a line parallel to the second axis, each of the multiple bubbles corresponding to one of the topics;

assign visual indicators to the pixels in the given bubble according to sentiments expressed in the corresponding records for the topic represented by the given bubble;

update the visualization to create a new time interval if a newly received record is outside a current time interval; and visualize the newly received record in one of the bubbles in the new time interval.

16. The method of claim 1, wherein the determining if each of the candidate terms corresponds to the critical event is further based on an event score assigned to each of the candidate terms and a specified critical event threshold.

17. The system of claim 11, wherein the determining if each of the candidate terms corresponds to the critical event is further based on an event score assigned to each of the candidate terms and a specified critical event threshold.

18. The system of claim 11, wherein the scoring of the candidate terms is further based on a context coherence metric that indicates whether a candidate term included in multiple ones of the records relate to a common topic.

19. The article of claim 15, wherein the determining if each of the candidate terms corresponds to the critical event is further based on an event score assigned to each of the candidate terms and a specified critical event threshold.

20. The article of claim 15, wherein to assign the visual indicators, the instructions further cause the system to assign different colors that correspond to a positive sentiment and a negative sentiment.

* * * * *